(12) United States Patent
Zhang et al.

(10) Patent No.: US 10,129,007 B2
(45) Date of Patent: Nov. 13, 2018

(54) ANSWER INFORMATION FEEDBACK METHOD, ANSWER INFORMATION RECEPTION METHOD, AND RELATED APPARATUSES

(71) Applicant: China Mobile Communications Corporation, Beijing (CN)

(72) Inventors: Xiaoran Zhang, Beijing (CN); Nan Li, Beijing (CN); Zhenping Hu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 180 days.

(21) Appl. No.: 15/100,999

(22) PCT Filed: Dec. 2, 2014

(86) PCT No.: PCT/CN2014/092763
§ 371 (c)(1),
(2) Date: Jun. 2, 2016

(87) PCT Pub. No.: WO2015/081840
PCT Pub. Date: Jun. 11, 2015

(65) Prior Publication Data
US 2016/0308658 A1      Oct. 20, 2016

(30) Foreign Application Priority Data

Dec. 2, 2013   (CN) .......................... 2013 1 0634860

(51) Int. Cl.
*H04W 72/04*      (2009.01)
*H04L 5/14*       (2006.01)
(Continued)

(52) U.S. Cl.
CPC .............. *H04L 5/14* (2013.01); *H04L 1/1678* (2013.01); *H04L 1/1861* (2013.01); *H04W 72/02* (2013.01); *H04L 1/1854* (2013.01)

(58) Field of Classification Search
CPC ....... H04L 1/1678; H04L 1/1854; H04L 5/14; H04L 1/1861; H04W 72/02
See application file for complete search history.

(56) References Cited

U.S. PATENT DOCUMENTS

2013/0194981 A1* 8/2013 Wang .................... H04L 1/1671
                                                                    370/280
2013/0322343 A1    12/2013 Seo et al.
(Continued)

FOREIGN PATENT DOCUMENTS

CN      102291227 A    12/2011
CN      102752085 A    10/2012
(Continued)

OTHER PUBLICATIONS

3GPPTSG RANWG1 Meeting #64, "'Remaining Issues of ACK/NACK Feedback for 1-37 LTE-A TDD', R1-110821, Taipei", the whole document, Feb. 25, 2011 (Feb. 25, 2011).
(Continued)

*Primary Examiner* — Mohamed A Kamara
*Assistant Examiner* — Ryan C Kavleski
(74) *Attorney, Agent, or Firm* — Arch & Lake LLP

(57) ABSTRACT

An answer information feedback method includes steps of: with respect to a current uplink subframe of a primary carrier in a TDD mode, determining, by a terminal, a downlink subframe of a secondary carrier in an SDL mode and corresponding to the current uplink subframe in answer information feedback as a to-be-fed-back downlink subframe, the to-be-fed-back downlink subframe being determined from designated downlink subframes of the second-
(Continued)

ary carrier in accordance with a downlink retransmission timing mode for a DL-reference UL/DL configuration of the secondary carrier, the designated downlink subframes including downlink subframes except a downlink subframe having a location identical to an uplink subframe indicated by the DL-reference UL/DL configuration, the DL-reference UL/DL configuration being identical to a timeslot configuration of the primary carrier; and transmitting answer information for the to-be-fed-back downlink subframe to a network side using the current uplink subframe.

31 Claims, 9 Drawing Sheets

(51) Int. Cl.
  *H04W 72/02* (2009.01)
  *H04L 1/16* (2006.01)
  *H04L 1/18* (2006.01)

(56) References Cited

U.S. PATENT DOCUMENTS

| | | |
|---|---|---|
| 2014/0044092 A1 | 2/2014 | Guan et al. |
| 2014/0092794 A1 | 4/2014 | Yang et al. |
| 2014/0153451 A1 | 6/2014 | Lin et al. |
| 2015/0124740 A1* | 5/2015 | Chen ............... H04W 16/14 370/329 |
| 2015/0188687 A1* | 7/2015 | Gao ............... H04L 1/1607 370/278 |
| 2016/0204906 A1* | 7/2016 | Cheng ............... H04L 1/1854 370/280 |
| 2016/0277169 A1* | 9/2016 | Park ............... H04L 1/1854 |
| 2016/0337030 A1 | 11/2016 | Yang et al. |

FOREIGN PATENT DOCUMENTS

| | | |
|---|---|---|
| WO | 2012108720 A2 | 8/2012 |
| WO | 2013066072 A1 | 5/2013 |

OTHER PUBLICATIONS

International Search Report for International application No. PCT/CN2014/092763 dated Mar. 6, 2015.
ZTE: "Remaining issues of ACK/NACK feedback for LTE-A TDD," 3GPP Draft, 3GPP TSG RAN WGJ Meeting #64, R1-1 10827, 3rd Generation Partnership Project (3GPP), Mobile Competence Centre, Feb. 15, 2011, 8 pages, XP050490602.
Ericsson et al.: "Applicable scenarios for TDD CA of different UL-DL configurations," 3GPP Draft, 3GPP TSG-RAN WG1 #66bis, R1-113532, 3rd Generation Partnership Project (3GPP), Mobile Competence Centre, Oct. 14, 2011, 6 pages, XP050538655.
International Search Report and Written Opinion (including English translation) issued in corresponding International Application No. PCT/CN2014/092763, dated Mar. 6, 2015, 17 pages.
Extended European Search Report issued in corresponding EP Application No. 14893282, dated Jul. 19, 2017, 10 pages.

* cited by examiner

Configuration #2 Of Primary Carrier 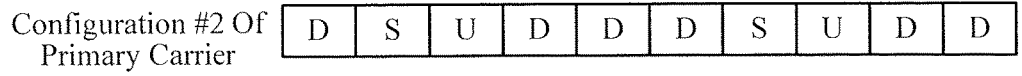

Configuration #0 Of Secondary Carrier 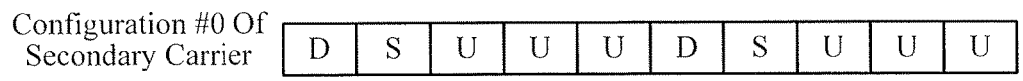

↓ Downlink Retransmission Timing Mode For Secondary Carrier

Configuration #2 Of Primary Carrier 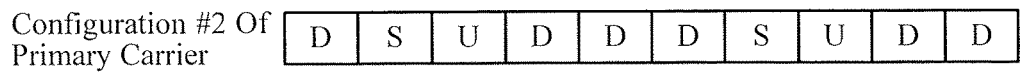

DL-Reference UL/ DL Configuration of Secondary Carrier 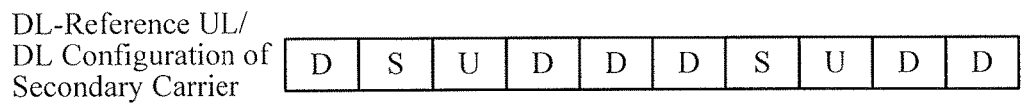

Fig.1

With Respect To a Current Uplink Subframe of a Primary Carrier, Determining, By a Terminal, a Downlink Subframe of a Secondary Carrier Corresponding To the Current Uplink Subframe in Answer Information Feedback — 201

Transmitting Answer Information for a To-Be-Fed-Back Downlink Subframe to a Network Side Using the Current Uplink Subframe — 202

Fig.2

301 Receiving, By a Network Side, Answer Information for a Downlink Subframe of a Secondary Carrier, Which Is Transmitted From a Terminal Using a Current Uplink Subframe of a Primary Carrier, the Downlink Subframe Corresponding To the Current Uplink Subframe in Answer Information Feedback

Fig.3

Configuration #2 Of Primary Carrier 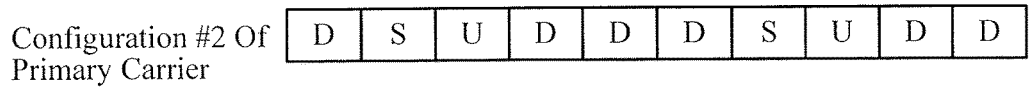

SDL Mode of Secondary Carrier 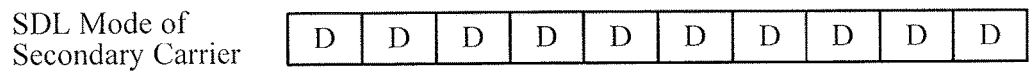

↓ Downlink Retransmission Timing Mode For Secondary Carrier

Configuration #2 Of Primary Carrier 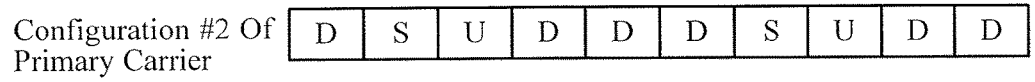

Downlink Subframes of Secondary Carrier 

Fig.4

Receiving, By a Network Side, Answer Information for a Downlink Subframe of a Secondary Carrier, Which Is Transmitted From a Terminal Using Subframe 2 of a Primary Carrier, the Downlink Subframe Corresponding To Subframe 2 in Answer Information Feedback          901

Fig.9

Configuration #2 Of Primary Carrier | D | S | U | D | D | D | S | U | D | D |

SDL Mode of Secondary Carrier | D | D | D | D | D | D | D | D | D | D |

Downlink Retransmission Timing Mode For Secondary Carrier

Configuration #2 Of Primary Carrier | D | S | U | D | D | D | S | U | D | D |

Downlink Subframes of Secondary Carrier | D | D | ▨ | D | D | D | D | D | D | D |

Fig.10

Receiving, By a Network Side, Answer Information for a Downlink Subframe of a Secondary Carrier, Which Is Transmitted From a Terminal Using a Current Uplink Subframe of a Primary Carrier, the Downlink Subframe Corresponding To the Current Uplink Subframe in Answer Information Feedback — 1501

Fig.15

| Configuration #2 of Primary Carrier | D | S | U | D | D | D | S | U | D | D |

| SDL Mode of Secondary Carrier | D | D | D | D | D | D | D | D | D | D |

Fig.16

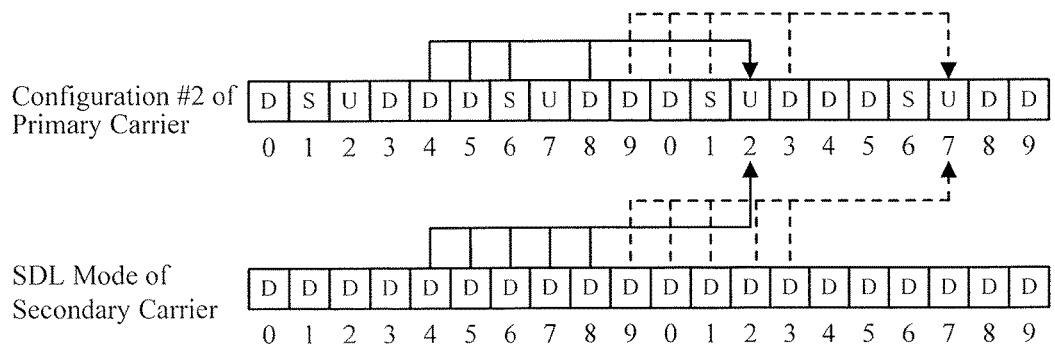

Fig.17

ANSWER INFORMATION FEEDBACK METHOD, ANSWER INFORMATION RECEPTION METHOD, AND RELATED APPARATUSES

CROSS-REFERENCE TO RELATED APPLICATION

This application is the U.S. national phase of PCT Application No. PCT/CN2014/092763 filed on Dec. 2, 2014, which claims a priority of the Chinese Patent Application No.201310634860.6 filed on Dec. 2, 2013, the disclosures of which are incorporated in their entirety by reference herein.

TECHNICAL FIELD

The present disclosure relates to the field of radio communication technology, in particular to an answer information feedback method, an answer information reception method, and related apparatuses.

BACKGROUND

Downlink retransmission timing for a Time Division Duplexing (TDD) mode and a Frequency Division Duplexing (FDD) has been specified in a $3^{rd}$ Generation Partnership Project (3GPP) Long Term Evolution (LTE) protocol.

For the FDD mode, answer information transmitted in an uplink (UL) subframe includes Acknowledgement/Negative Acknowledgement (ACK/NACK) information, and it may merely correspond to the data transmission in a downlink (DL) subframe, i.e., in the answer information feedback, one uplink subframe corresponds to one downlink subframe. In addition, in the case that the downlink transmission is detected by a terminal in a downlink subframe n-4, the answer information for the downlink subframe n-4 may be fed back in an uplink subframe n. In other words, in the downlink retransmission timing, the uplink subframe n corresponds to a fourth downlink subframe before the uplink subframe n, and it is used to feed back the answer information for this downlink subframe.

For the TDD mode, seven different timeslot configurations have been defined in the 3GPP protocol, i.e., configuration #0 to configuration #6 in Table 1. "D" represents the downlink subframe, "U" represents the uplink subframe, and "S" represents a special subframe. The answer information transmitted in one uplink subframe may correspond to the data transmission in one or more downlink subframes, i.e., in the answer information feedback, one uplink subframe may correspond to one or more downlink subframes. In addition, in the case that the downlink transmission has been detected by the terminal in downlink subframe n-k, the answer information for downlink subframe n-k will be fed back in uplink subframe n. In other words, in the downlink retransmission timing mode, the uplink subframe n corresponds to a $k^{th}$ downlink subframe before uplink subframe n, and it is used to feed back the answer information for this downlink subframe. Table 2 shows a value of k corresponding to each uplink subframe for feeding back the answer information with respect to the different TDD timeslot configurations.

TABLE 1

| Uplink-Downlink Configuration | Downlink-to-Uplink Switch-Point Periodicity | \multicolumn{10}{c}{TDD Timeslot Configurations Subframe Number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Downlink Retransmission Timing Modes for TDD Timeslot Configurations

| Uplink-Downlink Configuration | \multicolumn{10}{c}{Subframe Number} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Taking configuration #0 in Table 1 as an example, the uplink subframes include subframes 2 to 4, and subframes 7 to 9. As shown in Table 2, Subframes 2, 4, 7 and 9 are used to feed back the answer information. Subframe 2 corresponds to a sixth subframe before it, subframe 4 corresponds to a fourth subframe before it, subframe 7 corresponds to a sixth subframe before it, and subframe 9 corresponds to a fourth subframe before it.

Carrier aggregation has also been defined in the LTE protocol, i.e., more than two and less than five independent carriers may be aggregated by the terminal, so as to enhance a peak rate. For the carriers in the carrier aggregation, a primary carrier may be configured by a system for the terminal, and the other carriers may be taken as secondary carriers.

In the carrier aggregation, the answer information for the downlink subframes of the primary carrier and the secondary carriers may be fed back over the primary carrier. For the FDD carrier aggregation, a downlink data channel retransmission is similar to that for a single carrier. For the TDD carrier aggregation, in the case that the primary carrier has a timeslot configuration identical to the secondary carriers, the downlink data channel retransmission mode is similar to that for the single carrier. In the case that the primary carrier has a timeslot configuration different from the secondary carriers, it is necessary to define a DL-reference UL/DL configuration for the secondary carriers. At this time, in the downlink data channel retransmission timing for the secondary carriers, a downlink retransmission timing mode for the DL-reference UL/DL configuration may be adopted.

As shown in FIG. 1, in the TDD carrier aggregation, the configuration #2 in Table 1 is adopted by the primary carrier, the configuration #0 is adopted by the secondary carriers, and the configuration #2 is defined as the DL-reference UL/DL configuration for the secondary carriers. Correspondingly, depending on the downlink retransmission timing mode for the DL-reference UL/DL configuration (i.e., the configuration #2), in the downlink subframes of the secondary carriers, subframe 2 of the primary carrier may be used to transmit the answer information for the fourth, sixth, seventh and eighth subframes before it. However, among the fourth, sixth, seventh and eighth subframes, the sixth and seventh subframes are downlink subframes. In other words, subframe 2 of the primary carrier is used to transmit the answer information for the sixth and seventh subframes before it. Similarly, in the downlink subframes of the secondary carriers, subframe 7 of the primary carrier may be used to transmit the answer information for the sixth and seventh subframes before it.

A downlink data channel retransmission method for the carrier aggregation defined in the conventional 3GPP LTE protocol merely supports the carrier aggregation in an identical duplexing mode, i.e., it merely supports the TDD+TDD carrier aggregation and the FDD+FDD carrier aggregation. In future, apart from a licensed frequency band, the LTE may also use an unlicensed frequency band (e.g., 2.4 GHz or 5.8 GHz) that has been used by a Wireless Local Area Network (WLAN). The LTE using the unlicensed frequency band may be referred to as LTE-Unlicensed, LTE-U for short. The terminal may use the unlicensed frequency band for the carrier aggregation in the following four ways.

In a first way, the primary carrier is a carrier at the licensed frequency band, and the secondary carriers are carriers at the unlicensed frequency band. In addition, the FDD mode is adopted by the primary carrier, and a Supplement Downlink (SDL) mode is adopted by the secondary carriers, i.e., the unlicensed frequency band is merely used for the downlink transmission.

In a second way, the primary carrier is a carrier at the licensed frequency band, and the secondary carriers are carriers at the unlicensed frequency band. In addition, the FDD mode is adopted by the primary carrier, and the TDD mode is adopted by the secondary carriers.

In a third way, the primary carrier is a carrier at the licensed frequency band, and the secondary carriers are carriers at the unlicensed frequency band. In addition, the TDD mode is adopted by the primary carrier, and the SDL mode is adopted by the secondary carriers, i.e., the unlicensed frequency band is merely used for the downlink transmission.

In a fourth way, the primary carrier is a carrier at the licensed frequency band, and the secondary carriers are carriers at the unlicensed frequency band. In addition, the TDD mode is adopted by the primary carrier, and the TDD mode is adopted by the secondary carriers.

In the above four ways, in order to simplify the implementation of the terminal, the SDL mode may probably be adopted by the secondary carriers, and a TDD+SDL carrier aggregation mode may be used through the combination of the unlicensed frequency band for the secondary carriers and the licensed frequency band for the primary carrier. Currently, the 3GPP protocol has not yet proposed any relevant downlink data channel retransmission method for the TDD (adopted by the primary carrier)+SDL (adopted by the secondary carriers) carrier aggregation mode.

SUMMARY

An object of the present disclosure is to provide an answer information feedback method, an answer information reception method and related apparatuses, so as to feed back answer information under a condition where a TDD mode is adopted by a primary carrier and an SDL mode is adopted by secondary carriers.

In one aspect, the present disclosure provides in some embodiments an answer information feedback method, including steps of: with respect to a current uplink subframe of a primary carrier in a TDD mode, determining, by a terminal, a downlink subframe of a secondary carrier in an SDL mode and corresponding to the current uplink subframe in answer information feedback as a to-be-fed-back downlink subframe, the to-be-fed-back downlink subframe being determined from designated downlink subframes of the secondary carrier in accordance with a downlink retransmission timing mode for a DL-reference UL/DL configuration of the secondary carrier, the designated downlink subframes including downlink subframes except a downlink subframe having a location identical to an uplink subframe indicated by the DL-reference UL/DL configuration, the DL-reference UL/DL configuration being identical to a timeslot configuration of the primary carrier; and transmitting answer information for the to-be-fed-back downlink subframe to a network side using the current uplink subframe.

In another aspect, the present disclosure provides in some embodiments an answer information reception method, including a step of: receiving, by a network side, answer information for a downlink subframe of a secondary carrier in an SDL mode, which is transmitted from a terminal using a current uplink subframe of a primary carrier in a TDD mode, the downlink subframe corresponding to the current uplink subframe in answer information feedback. The downlink subframe corresponding to the current uplink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration is identical to a timeslot configuration of the primary carrier.

In yet another aspect, the present disclosure provides in some embodiments an answer information feedback apparatus, including: a first determination unit configured to, with respect to a current uplink subframe of a primary carrier in a TDD mode, determine a downlink subframe of a secondary carrier in an SDL mode and corresponding to the current uplink subframe in answer information feedback as a to-be-fed-back downlink subframe, the to-be-fed-back downlink subframe being determined from designated downlink subframes of the secondary carrier in accordance with a downlink retransmission timing mode for a DL-reference UL/DL configuration of the secondary carrier, the designated downlink subframes including downlink subframes except a downlink subframe having a location identical to an uplink subframe indicated by the DL-reference UL/DL configuration, the DL-reference UL/DL configuration being identical to a timeslot configuration of the primary carrier; and a transmission unit configured to transmit answer information for the to-be-fed-back downlink subframe to a network side using the current uplink subframe.

In still yet another aspect, the present disclosure provides in some embodiments an answer information reception apparatus, including a reception unit configured to receive answer information for a downlink subframe of a secondary carrier in an SDL mode, which is transmitted from a terminal using a current uplink subframe of a primary carrier in a TDD mode, the downlink subframe corresponding to the current uplink subframe in answer information feedback. The downlink subframe corresponding to the current uplink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration is identical to a timeslot configuration of the primary carrier.

According to the embodiments of the present disclosure, the DL-reference UL/DL configuration for the secondary carrier in the SDL mode is identical to the timeslot configuration of the primary carrier in the TDD mode, and the downlink subframe corresponding to the uplink subframe of the primary carrier may be determined from the designated downlink subframes of the secondary carrier in accordance with the downlink retransmission timing mode for the DL-reference UL/DL configuration. In addition, the answer information for the corresponding downlink subframe of the secondary carrier is fed back to the network side using the uplink subframe of the primary carrier, and the designated downlink subframes include the downlink subframes except the downlink subframe having a location identical to the uplink subframe indicated by the DL-reference UL/DL configuration. As a result, it is able to feed back the answer information under the condition where the TDD mode is adopted by the primary carrier and the SDL mode is adopted by the secondary carrier.

In still yet another aspect, the present disclosure provides in some embodiments an answer information feedback method, including steps of: with respect to subframe 2 of a primary carrier in a TDD mode, which serves as an uplink subframe, determining, by a terminal, a downlink subframe of a secondary carrier in an SDL mode and corresponding to subframe 2 in answer information feedback as a to-be-fed-back downlink subframe, the to-be-fed-back downlink subframe being determined from designated downlink subframes of the secondary carrier in accordance with a downlink retransmission timing mode for a DL-reference UL/DL configuration of the secondary carrier, the designated downlink subframes including downlink subframes except a downlink subframe having a location identical to an uplink subframe indicated by the DL-reference UL/DL configuration, the DL-reference UL/DL configuration including subframe 0 to subframe 9, in which subframe 1 is a special subframe, subframe 2 is an uplink subframe, and the other subframes are downlink subframes; and transmitting answer information for the to-be-fed-back downlink subframe to a network side using subframe 2.

In still yet another aspect, the present disclosure provides in some embodiments an answer information reception method, including a step of receiving, by a network side, answer information for a downlink subframe of a secondary carrier in an SDL mode, which is transmitted from a terminal using subframe 2 of a primary carrier in a TDD mode which serves as an uplink subframe, the downlink subframe corresponding to subframe 2 in answer information feedback. The downlink subframe corresponding to subframe 2 is determined from designated downlink subframes of the secondary carrier in accordance with a downlink retransmission timing mode for a DL-reference UL/DL configuration of the secondary carrier, the designated downlink subframes includes downlink subframes except a downlink subframe having a location identical to an uplink subframe indicated by the DL-reference UL/DL configuration, and the DL-reference UL/DL configuration includes subframe 0 to subframe 9, in which subframe 1 is a special subframe, subframe 2 is an uplink subframe, and the other subframes are downlink subframes.

In still yet another aspect, the present disclosure provides in some embodiments an answer information feedback apparatus, including: a determination unit configured to, with respect to subframe 2 of a primary carrier in a TDD mode, which serves as an uplink subframe, determine a downlink subframe of a secondary carrier in an SDI, mode and corresponding to subframe 2 in answer information feedback as a to-be-fed-back downlink subframe, the to-be-fed-back downlink subframe being determined from designated downlink subframes of the secondary carrier in accordance with a downlink retransmission timing mode for a DL-reference UL/DL configuration of the secondary carrier, the designated downlink subframes including downlink subframes except a downlink subframe having a location identical to an uplink subframe indicated by the DL-reference UL/DL configuration, the DL-reference UL/DL configuration including subframe 0 to subframe 9, in which subframe 1 is a special subframe, subframe 2 is an uplink subframe, and the other subframes are downlink subframes; and a transmission unit configured to transmit answer information for the to-be-fed-back downlink subframe to a network side using subframe 2.

In still yet another aspect, the present disclosure provides in some embodiments an answer information reception apparatus, including a reception unit configured to receive answer information for a downlink subframe of a secondary carrier in an SDL mode, which is transmitted from a terminal using subframe 2 of a primary carrier in a TDD mode which serves as an uplink subframe, the downlink subframe corresponding to subframe 2 in answer information feedback. The downlink subframe corresponding to subframe 2 is determined from designated downlink subframes of the secondary carrier in accordance with a downlink retransmission timing mode for a DL-reference UL/DL configuration of the secondary carrier, the designated downlink subframes includes downlink subframes except a downlink subframe having a location identical to an uplink subframe indicated by the DL-reference UL/DL, configuration, and the DL-reference UL/DL configuration includes subframe 0 to subframe 9, in which subframe 1 is a special subframe, subframe 2 is an uplink subframe, and the other subframes are downlink subframes.

According to the embodiments of the present disclosure, in subframe 0 to subframe 9 included in the DL-reference UL/DL configuration of the secondary carrier in the SDL mode, subframe 1 is a special subframe, subframe 2 is an uplink subframe, and the other subframes are downlink subframes. Subframe 2 of the primary carrier may be used to feed back the answer information for 9 downlink subframes in accordance with the downlink retransmission timing mode for the DL-reference UL/DL configuration, and the answer information is fed back through subframe 2 regardless of the timeslot configuration of the primary carrier. In this regard, the downlink subframe corresponding to subframe 2 of the primary carrier may be determined from the designated downlink subframes of the secondary carrier in accordance with the downlink retransmission timing mode for the DL-reference UL/DL configuration. In addition, the answer information for the corresponding downlink subframe of the secondary carrier is fed back to the network side using subframe 2 of the primary carrier, and the designated downlink subframes include the downlink subframes except the downlink subframe having a location identical to the uplink subframe indicated by the DL-reference UL/DL configuration. As a result, it is able to feed back the answer information under the condition where the TDD mode is adopted by the primary carrier and the SDL mode is adopted by the secondary carrier.

In still yet another aspect, the present disclosure provides in some embodiments an answer information feedback method, including steps of: acquiring, by a terminal, a timeslot configuration for a primary carrier in a TDD mode; with respect to a current uplink subframe of the primary carrier, determining a downlink subframe of a secondary carrier in an SDL mode and corresponding to the current uplink subframe in answer information feedback as a to-be-fed-back downlink subframe in accordance with a predetermined downlink retransmission timing mode of the secondary carrier for the timeslot configuration, in the predetermined downlink retransmission timing mode, uplink subframes of the primary carrier corresponding to different downlink subframes of the secondary carrier, a set of the downlink subframes of the secondary carrier corresponding to the respective uplink subframes of the primary carrier including all downlink subframes of the secondary carrier, one of the uplink subframes of the primary carrier being separated from a corresponding downlink subframe of the secondary carrier by at least four subframes; and transmitting answer information for the to-be-fed-back downlink subframe to a network side using the current uplink subframe.

In still yet another aspect, the present disclosure provides in some embodiments an answer information reception method, including a step of receiving, by a network side, answer information for a downlink subframe of a secondary carrier in an SDL mode, which is transmitted from a terminal using a current uplink subframe of a primary carrier in a TDD mode, the downlink subframe corresponding to the current uplink subframe in answer information feedback. The downlink subframe corresponding to the current uplink subframe is determined from downlink subframes of the secondary carrier in accordance with a predetermined downlink retransmission timing mode of the secondary carrier for a timeslot configuration of the primary carrier. In the predetermined downlink retransmission timing mode, uplink subframes of the primary carrier correspond to different downlink subframes of the secondary carrier, a set of the downlink subframes of the secondary carrier corresponding to the respective uplink subframes of the primary carrier includes all downlink subframes of the secondary carrier, and one of the uplink subframes of the primary carrier is separated from a corresponding downlink subframe of the secondary carrier by at least four subframes.

In still yet another aspect, the present disclosure provides in some embodiments an answer information feedback apparatus, including: a determination unit configured to, with respect to a current uplink subframe of a primary carrier in a TDD mode, determine a downlink subframe of a secondary carrier in an SDL mode and corresponding to the current uplink subframe in answer information feedback as a to-be-fed-back downlink subframe in accordance with a predetermined downlink retransmission timing mode of the secondary carrier for a timeslot configuration of the primary carrier, in the predetermined downlink retransmission timing mode, uplink subframes of the primary carrier corresponding to different downlink subframes of the secondary carrier, a set of the downlink subframes of the secondary carrier corresponding to the respective uplink subframes of the primary carrier including all downlink subframes of the secondary carrier, one of the uplink subframes of the primary carrier being separated from a corresponding downlink subframe of the secondary carrier by at least four subframes; and a transmission unit configured to transmit answer information for the to-be-fed-back downlink subframe to a network side using the current uplink subframe.

In still another aspect, the present disclosure provides in some embodiments an answer information reception apparatus, including a reception unit configured to receive answer information for a downlink subframe of a secondary carrier in an SDL mode, which is transmitted from a terminal using a current uplink subframe of a primary carrier in a TDD mode, the downlink subframe corresponding to the current uplink subframe in answer information feedback. The downlink subframe corresponding to the current uplink subframe is determined from downlink subframes of the secondary carrier in accordance with a predetermined downlink retransmission timing mode of the secondary carrier for a timeslot configuration of the primary carrier. In the predetermined downlink retransmission timing mode, uplink subframes of the primary carrier correspond to different downlink subframes of the secondary carrier, a set of the downlink subframes of the secondary carrier corresponding to the respective uplink subframes of the primary carrier includes all downlink subframes of the secondary carrier, and one of the uplink subframes of the primary carrier is separated from a corresponding downlink subframe of the secondary carrier by at least four subframes.

According to the embodiments of the present disclosure, the downlink retransmission timing mode is pre-configured for the secondary carrier in accordance with the timeslot configuration of the primary carrier. In the predetermined downlink retransmission timing mode, the uplink subframes of the primary carrier correspond to different downlink subframes of the secondary carrier, the set of the downlink subframes of the secondary carrier corresponding to the respective uplink subframes of the primary carrier includes all downlink subframes of the secondary carrier, and one of the uplink subframes of the primary carrier is separated from a corresponding downlink subframe of the secondary carrier by at least four subframes. In this way, after the acquisition of the timeslot configuration of the primary carrier, the terminal may use the current uplink subframe of the primary carrier to feed back the answer information for the downlink subframe of the secondary carrier corresponding to the current uplink subframe in accordance with the predetermined downlink retransmission timing mode of the secondary carrier for the timeslot configuration of the primary carrier. As a result, it is able to feed back the answer information under the condition where the TDD mode is adopted by the primary carrier and the SDL mode is adopted by the secondary carrier.

The other features and advantages of the present disclosure will be described hereinafter, and parts of them will become more obvious or will be understood through the implementation of the present disclosure. The objects and the other advantages of the present disclosure may be achieved through the description, the claims and structures specified in the drawings.

BRIEF DESCRIPTION OF THE DRAWINGS

The following drawings constitute a part of the description and, together with the embodiments, are for illustrative purposes only, but shall not be used to limit the scope of the present disclosure. In these drawings, FIG. 1 is a schematic view showing a downlink retransmission timing mode for a DL-reference UL/DL configuration in a conventional TDD carrier aggregation;

FIG. 2 is a flow chart of an answer information feedback method according to the first embodiment of the present disclosure;

FIG. 3 is a flow chart of an answer information reception method according to the first embodiment of the present disclosure;

FIG. 4 is a schematic view showing a downlink retransmission timing mode of a secondary carrier according to the first embodiment of the present disclosure;

FIG. 9 is a flow chart of an answer information reception method according to the second embodiment of the present disclosure;

FIG. 10 is a schematic view showing a downlink retransmission timing mode of a secondary carrier according to the second embodiment of the present disclosure;

FIG. 15 is a flow chart of an answer information reception method according to the third embodiment of the present disclosure;

FIG. 16 is a schematic view showing a downlink retransmission timing mode of a secondary carrier according to the third embodiment of the present disclosure;

FIG. 17 is a schematic view showing answer information feedback corresponding to the downlink retransmission timing mode in FIG. 16 according to the third embodiment of the present disclosure;

DETAILED DESCRIPTION OF THE EMBODIMENTS

Figure 5:
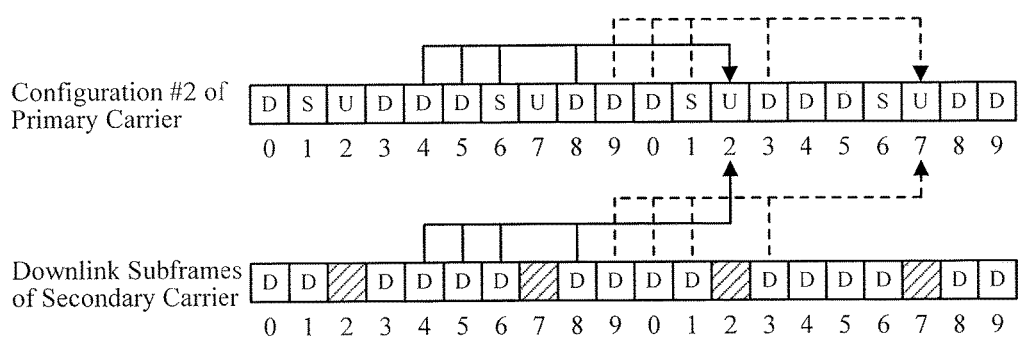
FIG. 5 is a schematic view showing answer information feedback corresponding to the downlink retransmission timing mode in FIG. 4 according to the first embodiment of the present disclosure.

The present disclosure provides in some embodiments an answer information feedback method, an answer information reception method and related apparatuses, so as to feed back answer information under a condition where a TDD mode is adopted by a primary carrier and an SDL mode is adopted by a secondary carrier. The present disclosure will be described hereinafter in conjunction with the drawings and embodiments. It should be appreciated that, the following embodiments are for illustrative purposes only, but shall not be used to limit the scope of the present disclosure. In addition, in the case of no conflict, the embodiments and the features mentioned in the embodiments may be combined in any form.

First Embodiment

The present disclosure provides in this embodiment an answer information feedback method which, as shown in FIG. 2, includes the following steps.

Step 201: with respect to a current uplink subframe of a primary carrier in a TDD mode, determining, by a terminal, a downlink subframe of a secondary carrier in an SDL mode and corresponding to the current uplink subframe in answer information feedback as a to-be-fed-back downlink subframe.

The to-be-fed-back downlink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration is identical to a timeslot configuration of the primary carrier.

Step 202: transmitting answer information for the to-be-fed-back downlink subframe to a network side using the current uplink subframe.

Correspondingly, the present disclosure further provides in this embodiment an answer information reception method which, as shown in FIG. 3, includes the following step.

Step 301: receiving, by a network side, answer information for a downlink subframe of a secondary carrier in an SDL mode, which is transmitted from a terminal using a current uplink subframe of a primary carrier in a TDD mode, the downlink subframe corresponding to the current uplink subframe in answer information feedback.

The downlink subframe corresponding to the current uplink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration is identical to a timeslot configuration of the primary carrier.

In the methods as shown in FIGS. 2-3, prior to the feedback of the answer information between the network side and the terminal, the network side may determine a timeslot configuration for the primary carrier as the DL-reference UL/DL configuration of the secondary carrier. Then, with respect to each uplink subframe of the primary carrier for feeding back the answer information, the network side may determine the downlink subframe corresponding to the uplink subframe in the answer information feedback from the designated downlink subframes of the secondary carrier in accordance with the downlink retransmission timing mode for the DL-reference UL/DL configuration, acquire feedback indication information indicating a determination result, and transmit the feedback indication information to the terminal. Next, upon the receipt of the feedback indication information, the terminal may, during the feedback of the answer information to the network side, in accordance with the feedback indication information, determine the downlink subframe of the secondary carrier and corresponding to the current uplink subframe of the primary carrier in the answer information feedback.

Alternatively, in the methods as shown in FIGS. 2-3, prior to the feedback of the answer information between the network side and the terminal, the terminal may determine the timeslot configuration of the primary carrier as the DL-reference UL/DL configuration for the secondary carrier. Then, with respect to each uplink subframe of the primary carrier for feeding back the answer information, the terminal may determine the downlink subframe corresponding to the uplink subframe in the answer information feedback from the designated downlink subframes of the secondary carrier in accordance with the downlink retransmission timing mode for the DL-reference UL/DL configuration, and store a correspondence between the uplink subframe and the downlink subframe. In this way, in the subsequent feedback of the answer information to the network side, the terminal may determine the downlink subframe of the secondary carrier corresponding to the current uplink subframe of the primary carrier in the answer information feedback in accordance with the correspondence.

In the first embodiment of the present disclosure, the DL-reference UL/DL configuration of the secondary carrier is identical to the timeslot configuration of the primary carrier. Hence, on the basis of the downlink retransmission timing mode for the DL-reference UL/DL configuration, for the downlink subframe of the secondary carrier having a location identical to the uplink subframe indicated by the DL-reference UL/DL configuration, there is no corresponding uplink subframe for feeding back its answer information. In this regard, during the communication between the network side and the terminal through the secondary carrier, the data transmission may be prohibited in the downlink subframe of the secondary carrier having a location identical to the uplink subframe indicated by the DL-reference UL/DL configuration.

For example, the network side does not transmit data and the terminal does not receive data in the downlink subframe of the secondary carrier having a location identical to the uplink subframe indicated by the DL-reference UL/DL configuration.

In the first embodiment of the present disclosure, the answer information feedback for the primary carrier may be carried out in accordance with the downlink retransmission timing mode for the timeslot configuration of the primary carrier, which will not be particularly defined herein.

FIG. 4 is a schematic view showing the downlink retransmission timing mode of the secondary carrier according to the first embodiment of the present disclosure, and FIG. 5 is a schematic view showing the answer information feedback corresponding to the downlink retransmission timing mode in FIG. 4.

Configuration #2 in Table 1 is adopted by the primary carrier, the SDL mode is adopted by the secondary carrier, and the DL-reference UL/DL configuration of the secondary carrier is identical to the timeslot configuration of the primary carrier, i.e., the configuration #2. On the basis of the downlink retransmission timing mode for the configuration #2 in Table 2, subframe 2 of the primary carrier is used to feed back the answer information for the fourth, the sixth, the seventh and eighth downlink subframes of the secondary carrier before subframe 2, and subframe 7 of the primary carrier is used to feed back the answer information for the fourth, the sixth, the seventh and eighth downlink subframes of the secondary carrier before subframe 7, e.g., the downlink subframes directed to subframe 2 and the subframe 7 through arrows in FIG. 5.

In FIGS. 4 and 5, the uplink subframes indicated by the DL-reference UL/DL configuration include subframe 2 and subframe 7, and the downlink subframes of the secondary carrier having the locations identical to the uplink subframes include subframe 2 and subframe 7. Hence, during the communication between the network side and the terminal through the secondary carrier, the data transmission may be prohibited in subframe 2 and subframe 7 of the secondary carrier.

Figure 6:
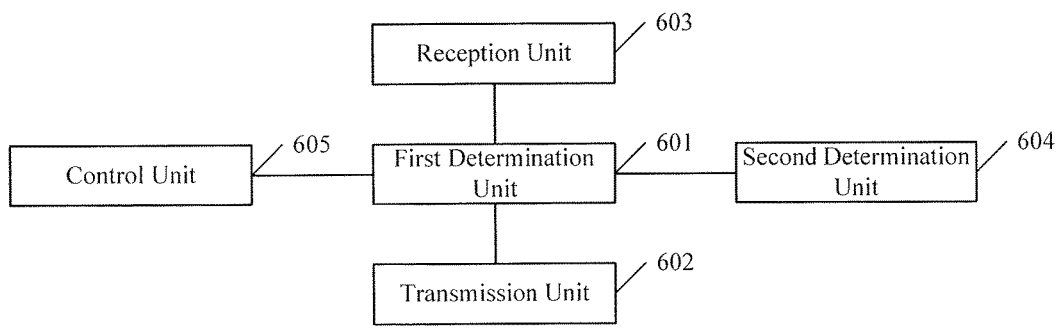
FIG. 6 is a schematic view showing an answer information feedback apparatus according to the first embodiment of the present disclosure.

Based on an identical inventive concept, the present disclosure further provides in this embodiment an answer information feedback apparatus for a terminal which, as shown in FIG. 6, includes a first determination unit 601 and a transmission unit 602. The first determination unit 601 is configured to, with respect to a current uplink subframe of a primary carrier in a TDD mode, determine a downlink subframe of a secondary carrier in an SDL mode and corresponding to the current uplink subframe in answer information feedback as a to-be-fed-back downlink subframe. The to-be-fed-back downlink subframe is determined from designated downlink subframes of the secondary carrier in accordance with a downlink retransmission timing mode for a DL-reference UL/DL configuration of the secondary carrier. The designated downlink subframes include downlink subframes except a downlink subframe having a location identical to an uplink subframe indicated by the DL-reference UL/DL configuration, and the DL-reference UL/DL configuration is identical to a timeslot configuration of the primary carrier. The transmission unit 602 is configured to transmit answer information for the to-be-fed-back downlink subframe to a network side using the current uplink subframe.

Alternatively, the answer information feedback apparatus further includes a reception unit 603 configured to receive from the network side feedback indication information indicating, with respect to each uplink subframe of the primary carrier for feeding back the answer information, a downlink subframe in the designated downlink subframes of the secondary carrier, which is corresponding to the uplink subframe in the answer information feedback. The first determination unit 601 is specifically configured to determine the downlink subframe of the secondary carrier corresponding to the current uplink subframe in the answer information feedback in accordance with the feedback indication information.

Alternatively, the answer information feedback apparatus further includes a second determination unit 604 configured to determine a timeslot configuration of the primary carrier as the DL-reference UL/DL configuration of the secondary carrier, determine, with respect to each uplink subframe of the primary carrier for feeding back the answer information, a downlink subframe in the designated downlink subframes of the secondary carrier corresponding to the uplink subframe in the answer information feedback in accordance with the downlink retransmission timing mode for the DL-reference UL/DL configuration, and store a correspondence between the downlink subframe and the uplink subframe. The first determination unit 601 is specifically configured to determine the downlink subframe of the secondary carrier corresponding to the current uplink subframe in the answer information feedback in accordance with the correspondence.

Alternatively, the answer information feedback apparatus further includes a control unit 605 configured to, during the communication with the network side through the secondary carrier, prohibit the data transmission in the downlink subframe of the secondary carrier having a location identical to the uplink subframe indicated by the DL-reference UL/DL configuration.

The functions of these units may refer to the steps of the above-mentioned method, and thus will not be particularly defined herein.

Figure 7:
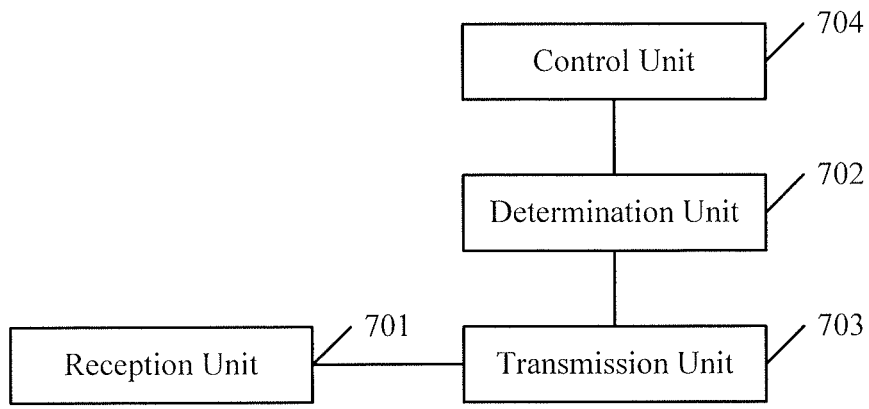
FIG. 7 is a schematic view showing an answer information reception apparatus according to the first embodiment of the present disclosure.

Based on an identical inventive concept, the present disclosure provides in this embodiment an answer information reception apparatus for a network side which, as shown in FIG. 7, includes a reception unit 701 configured to receive answer information for a downlink subframe of a secondary carrier in an SDL mode, which is transmitted from a terminal using a current uplink subframe of a primary carrier in a TDD mode, the downlink subframe corresponding to the current uplink subframe in answer information feedback.

The downlink subframe corresponding to the current uplink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration is identical to a timeslot configuration of the primary carrier.

Alternatively, the answer information reception apparatus further includes a determination unit 702 and a transmission unit 703. The determination unit 702 is configured to determine a timeslot configuration of the primary carrier as the DL-reference UL/DL configuration of the secondary carrier, determine, with respect to each uplink subframe of the primary carrier for feeding back the answer information, a downlink subframe in the designated downlink subframes of the secondary carrier corresponding to the uplink subframe in the answer information feedback in accordance with the downlink retransmission timing mode for the DL-reference UL/DL configuration, and acquire feedback indication information indicating a determination result. The transmission unit 703 is configured to transmit the feedback indication information to the terminal.

Alternatively, the answer information reception apparatus further includes a control unit 704 configured to, during the communication with the terminal through the secondary carrier, prohibit the data transmission in the downlink subframe of the secondary carrier having the location identical to the uplink subframe indicated by the DL-reference UL/DL configuration.

The functions of these units may refer to the steps of the above-mentioned method, and thus will not be particularly defined herein.

In the first embodiment of the present disclosure, the primary carrier may be a carrier at a licensed frequency band, and the secondary carrier may be a carrier at an unlicensed frequency band.

According to the first embodiment of the present disclosure, the DL-reference UL/DL configuration for the secondary carrier in the SDL mode is identical to the timeslot configuration for the primary carrier in the TDD mode, and the downlink subframe corresponding to the uplink subframe of the primary carrier may be determined from the designated downlink subframes of the secondary carrier in accordance with the downlink retransmission timing mode for the DL-reference UL/DL configuration. In addition, the answer information for the corresponding downlink subframe of the secondary carrier is fed back to the network side using the uplink subframe of the primary carrier, and the designated downlink subframes include the downlink subframes except the downlink subframe having a location identical to the uplink subframe indicated by the DL-reference UL/DL configuration. As a result, it is able to feed back the answer information under the condition where the TDD mode is adopted by the primary carrier and the SDL mode is adopted by the secondary carrier.

Second Embodiment

Figure 8:
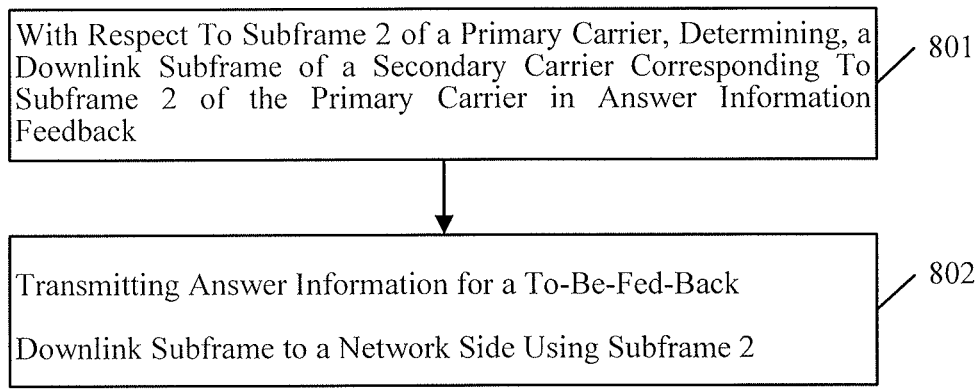
FIG. 8 is a flow chart of an answer information feedback method according to the second embodiment of the present disclosure.

The present disclosure provides in this embodiment an answer information feedback method which, as shown in FIG. 8, includes the following steps.

Step 801: with respect to subframe 2 of a primary carrier in a TDD mode, which serves as an uplink subframe, determining, by a terminal, a downlink subframe of a secondary carrier in an SDL mode and corresponding to subframe 2 in answer information feedback as a to-be-fed-back downlink subframe.

The to-be-fed-back downlink subframe is determined from designated downlink subframes of the secondary carrier in accordance with a downlink retransmission timing mode for a DL-reference UL/DL configuration of the secondary carrier, the designated downlink subframes include downlink subframes except a downlink subframe having a location identical to an uplink subframe indicated by the DL-reference UL/DL configuration, and the DL-reference UL/DL configuration includes subframe 0 to subframe 9, in which subframe 1 is a special subframe, subframe 2 is an uplink subframe, and the other subframes are downlink subframes.

Step 802: transmitting answer information for the to-be-fed-back downlink subframe to a network side using subframe 2.

Correspondingly, the present disclosure further provides in the second embodiment an answer information reception method which, as shown in FIG. 9, includes Step 901 of receiving, by a network side, answer information for a downlink subframe of a secondary carrier in an SDL mode, which is transmitted from a terminal using subframe 2 of a primary carrier in a TDD mode which serves as an uplink subframe, the downlink subframe corresponding to subframe 2 in answer information feedback.

The downlink subframe corresponding to subframe 2 is determined from designated downlink subframes of the secondary carrier in accordance with a downlink retransmission timing mode for a DL-reference UL/DL configuration of the secondary carrier, the designated downlink subframes includes downlink subframes except a downlink subframe having a location identical to an uplink subframe indicated by the DL-reference UL/DL configuration, and the DL-reference UL/DL configuration includes subframe 0 to subframe 9, in which subframe 1 is a special subframe, subframe 2 is an uplink subframe, and the other subframes are downlink subframes.

In the methods as shown in FIGS. 8 and 9, prior to the feedback of the answer information between the network side and the terminal, the network side may determine that, in subframes 0-9 for the DL-reference UL/DL configuration of the secondary carrier, subframe 1 is a special subframe, subframe 2 is an uplink subframe, and the other subframes are downlink subframes, i.e., the configuration #5 in Table 1. Then, the network side may determine, with respect to subframe 2 of the primary carrier for feeding back the answer information, the downlink subframe in the designated downlink subframes of the secondary carrier corresponding to subframe 2 in the answer' information feedback in accordance with the downlink retransmission timing mode for the DL-reference UL/DL configuration, i.e., the downlink retransmission timing mode for the configuration #5 in Table 2, acquire feedback indication information indicating a determination result, and transmit the feedback indication information to the terminal. Upon the receipt of the feedback indication information, the terminal may, during the feedback of the answer information to the network side, determine the downlink subframe of the secondary carrier corresponding to subframe 2 of the primary carrier in the answer information feedback in accordance with the feedback indication information.

Alternatively, in the methods as shown in FIGS. 8 and 9, prior to the feedback of the answer information between the network side and the terminal, the terminal may determine that, in subframes 0-9 for the DL-reference UL/DL configuration of the secondary carrier, subframe 1 is a special subframe, subframe 2 is an uplink subframe, and the other subframes are downlink subframes, i.e., the configuration #5 in Table 1. Then, the terminal may determine, with respect to subframe 2 of the primary carrier for feeding back the answer information, the downlink subframe in the designated downlink subframes of the secondary carrier corresponding to subframe 2 in the answer information feedback in accordance with the downlink retransmission timing mode for the DL-reference UL/DL configuration, i.e., the downlink retransmission timing mode for the configuration #5 in Table 2, and store a correspondence between the downlink subframe and the uplink subframe. Next, during the feedback of the answer information to the network side, the terminal, may determine the downlink subframe of the secondary carrier corresponding to subframe 2 of the primary carrier in the answer information feedback in accordance with the correspondence.

In the second embodiment of the present disclosure, on the basis of the downlink retransmission timing mode for the selected DL-reference UL/DL configuration of the secondary carrier, for the downlink subframe of the secondary carrier having a location identical to the uplink subframe indicated by the DL-reference UL/DL configuration, i.e., downlink subframe 2, there is no corresponding uplink subframe for feeding back its answer information. In this regard, during the communication between the network side and the terminal through the secondary carrier, the data transmission may be prohibited in the downlink subframe of the secondary carrier having the location identical to the uplink subframe indicated by the DL-reference UL/DL configuration.

For example, the network side does not transmit data and the terminal does not receive data in the downlink subframe of the secondary carrier having the location identical to the uplink subframe indicated by the DL-reference UL/DL configuration.

In the second embodiment of the present disclosure, the answer information feedback for the primary carrier may be carried out in accordance with the downlink retransmission timing mode for the timeslot configuration of the primary carrier, which will not be particularly defined herein.

Figure 11:
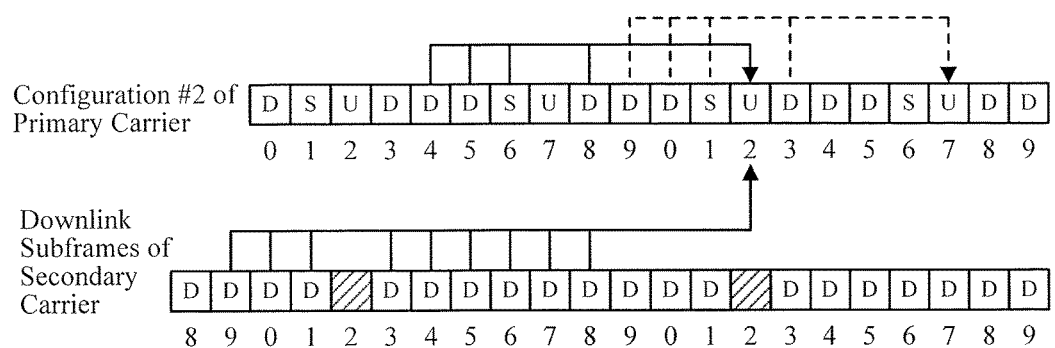
FIG. 11 is a schematic view showing answer information feedback corresponding to the downlink retransmission timing mode in FIG. 10 according to the second embodiment of the present disclosure.

FIG. 10 is a schematic view showing the downlink retransmission timing mode of the secondary carrier according to the second embodiment of the present disclosure, and FIG. 11 is a schematic view showing the answer information feedback corresponding to the downlink retransmission timing mode in FIG. 10.

Configuration #2 in Table 1 is adopted by the primary carrier, and an SDL mode is adopted by the secondary carrier. In addition, the DL-reference UL/DL configuration of the secondary carrier includes subframes 0-9 in which subframe 1 is a special subframe, subframe 2 is an uplink subframe, and the other subframes are downlink subframes, i.e., configuration #5. On the basis of the downlink retransmission timing mode for the configuration #5 in Table 2, subframe 2 of the primary carrier is used to feed back the answer information for the fourth to ninth and the eleventh to thirteenth downlink subframes of the secondary carrier before subframe 2, i.e., the downlink subframes directed to subframe 2 through arrows in FIG. 11.

In FIGS. 10 and 11, the uplink subframe indicated by the DL-reference UL/DL configuration is subframe 2, and the downlink subframe of the secondary carrier having the location identical thereto is subframe 2. In this regard, during the communication between the network side and the terminal through the secondary carrier, the data transmission may be prohibited in subframe 2 of the secondary carrier.

Figure 12:
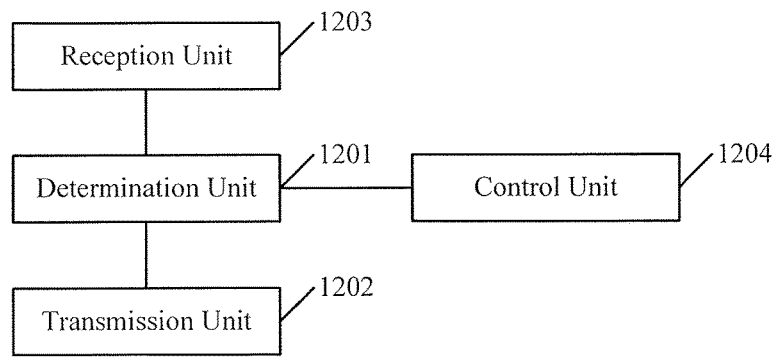
FIG. 12 is a schematic view showing an answer information feedback apparatus according to the second embodiment of the present disclosure.

Based on an identical inventive concept, the present disclosure further provides in the second embodiment an answer information feedback apparatus for a terminal which, as shown in FIG. 12, includes a determination unit 1201 and a transmission unit 1202. The determination unit 1201 is configured to, with respect to subframe 2 of a primary carrier in a TDD mode, which serves as an uplink subframe, determine a downlink subframe of a secondary carrier in an SDL mode and corresponding to subframe 2 in answer information feedback as a to-be-fed-back downlink subframe. The to-be-fed-back downlink subframe is determined from designated downlink subframes of the secondary carrier in accordance with a downlink retransmission timing mode for a DL-reference UL/DL configuration of the secondary carrier. The designated downlink subframes include downlink subframes except a downlink subframe having a location identical to an uplink subframe indicated by the DL-reference UL/DL configuration, and the DL-reference UL/DL configuration includes subframe 0 to subframe 9, in which subframe 1 is a special subframe, subframe 2 is an uplink subframe, and the other subframes are downlink subframes. The transmission unit 1202 is configured to transmit answer information for the to-be-fed-back downlink subframe to a network side using subframe 2.

Alternatively, the answer information feedback apparatus further includes a reception unit 1203 configured to receive from the network side feedback indication information indicating, with respect to subframe 2 of the primary carrier for feeding back the answer information and serving as an uplink subframe, a downlink subframe in the designated downlink subframes of the secondary carrier corresponding to subframe 2 in the answer information feedback. The determination unit 1201 is specifically configured to determine the downlink subframe of the secondary carrier corresponding to subframe 2 in the answer information feedback in accordance with the feedback indication information.

Alternatively, the answer information feedback apparatus further includes a control unit 1204 configured to, during the communication with the network side through the secondary carrier, prohibit the data transmission in the downlink subframe of the secondary carrier having the location identical to the uplink subframe indicated by the DL-reference UL/DL configuration.

The functions of these units may refer to the steps of the above-mentioned method, and thus will not be particularly defined herein.

Figure 13:
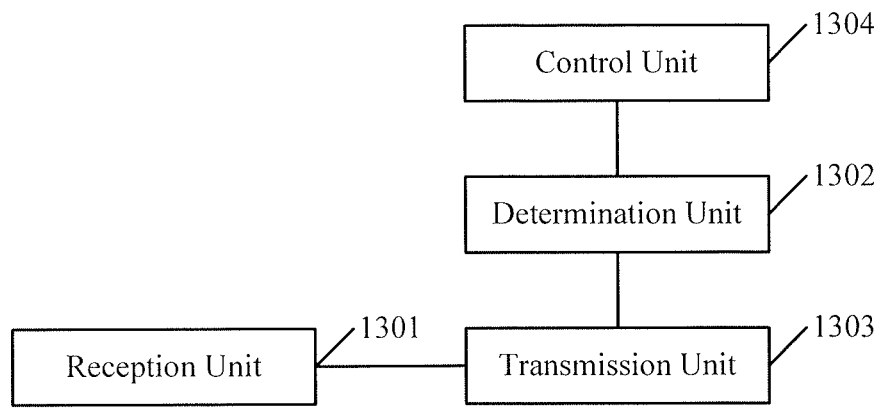
FIG. 13 is a schematic view showing an answer information reception apparatus according to the second embodiment of the present disclosure.

Based on an identical inventive concept, the present disclosure further provides in the second embodiment an answer information reception apparatus for a network side which, as shown in FIG. 13, includes a reception unit 1301 configured to receive answer information for a downlink subframe of a secondary carrier in an SDL mode, which is transmitted from a terminal using subframe 2 of a primary carrier in a TDD mode which serves as an uplink subframe, the downlink subframe corresponding to subframe 2 in answer information feedback.

The downlink subframe corresponding to subframe 2 is determined from designated downlink subframes of the secondary carrier in accordance with a downlink retransmission timing mode for a DL-reference UL/DL configuration of the secondary carrier, the designated downlink subframes includes downlink subframes except a downlink subframe having a location identical to an uplink subframe indicated by the DL-reference UL/DL configuration, and the DL-reference UL/DL configuration includes subframe 0 to subframe 9, in which subframe 1 is a special subframe, subframe 2 is an uplink subframe, and the other subframes are downlink subframes.

Alternatively, the answer information reception apparatus further includes a determination unit 1302 and a transmission unit 1303. The determination unit 1302 is configured to determine that, in subframes 0 to 9 for the DL-reference UL/DL configuration of the secondary carrier, subframe 1 is a special subframe, subframe 2 is an uplink subframe and the other subframes are downlink subframes, determine, with respect to subframe 2 of the primary carrier for feeding back the answer information, a downlink subframe in the designated downlink subframes of the secondary carrier corresponding to subframe 2 in the answer information feedback in accordance with the downlink retransmission timing mode for the DL-reference UL/DL configuration, and acquire feedback indication information indicating a determination result. The transmission unit 1303 is configured to transmit the feedback indication information to the terminal.

Alternatively, the answer information reception apparatus further includes a control unit 1304 configured to, during the communication with the terminal through the secondary carrier, prohibit the data transmission in the downlink subframe of the secondary carrier having the location identical to the uplink subframe indicated by the DL-reference UL/DL configuration.

The functions of these units may refer to the steps of the above-mentioned method, and thus will not be particularly defined herein.

In the second embodiment of the present disclosure, the primary carrier may be a carrier at a licensed frequency band, and the secondary carrier may be a carrier at an unlicensed frequency band.

According to the second embodiment of the present disclosure, in subframe 0 to subframe 9 included in the DL-reference UL/DL configuration of the secondary carrier in the SDL mode, subframe 1 is a special subframe, subframe 2 is an uplink subframe, and the other subframes are downlink subframes. Subframe 2 of the primary carrier may be used to feed back the answer information for 9 downlink subframes in accordance with the downlink retransmission timing mode for the DL-reference UL/DL configuration, and the answer information is fed back through subframe 2 regardless of the timeslot configuration of the primary carrier. In this regard, the downlink subframe corresponding to subframe 2 of the primary carrier may be determined from the designated downlink subframes of the secondary carrier in accordance with the downlink retransmission timing mode for the DL-reference UL/DL configuration. In addition, the answer information for the corresponding downlink subframe of the secondary carrier is fed back to the network side using subframe 2 of the primary carrier, and the designated downlink subframes include the downlink subframes except the downlink subframe having a location identical to the uplink subframe indicated by the DL-reference UL/DL configuration. As a result, it is able to feed back the answer information under the condition where the TDD mode is adopted by the primary carrier and the SDL mode is adopted by the secondary carrier.

Third Embodiment

Figure 14:
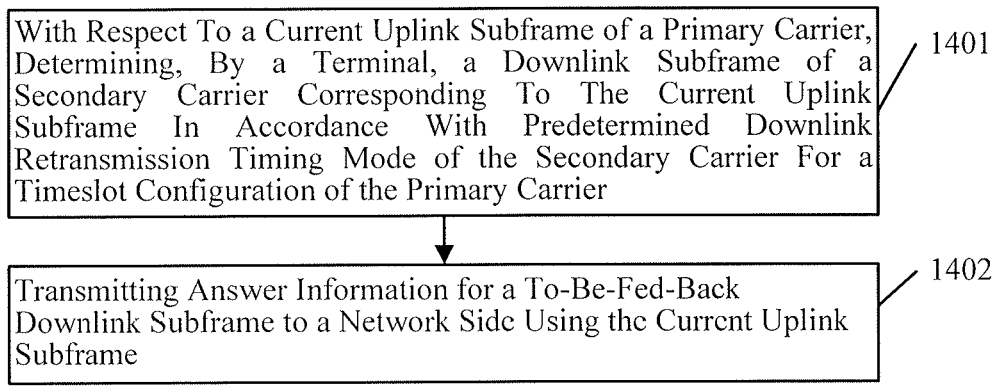
FIG. 14 is a flow chart of an answer information feedback method according to the third embodiment of the present disclosure.

The present disclosure provides in this embodiment an answer information feedback method which, as shown in FIG. 14, includes the following steps.

Step 1401: with respect to a current uplink subframe of a primary carrier in a TDD mode, determining, by a terminal, a downlink subframe of a secondary carrier in an SDL mode and corresponding to the current uplink subframe in answer information feedback as a to-be-fed-back downlink subframe in accordance with a predetermined downlink retransmission timing mode of the secondary carrier for a timeslot configuration of the primary carrier, in the predetermined downlink retransmission timing mode, uplink subframes of the primary carrier corresponding to different downlink subframes of the secondary carrier, a set of the downlink subframes of the secondary carrier corresponding to the uplink subframes of the primary carrier including all downlink subframes of the secondary carrier, one of the uplink subframes of the primary carrier being separated from a corresponding downlink subframe of the secondary carrier by at least four subframes.

Step 1402: transmitting answer information for the to-be-fed-back downlink subframe to a network side using the current uplink subframe.

Correspondingly, the present disclosure further provides in this embodiment an answer information reception method which, as shown in FIG. 15, includes Step 1501 of receiving, by a network side, answer information for a downlink subframe of a secondary carrier in an SDL mode, which is transmitted from a terminal using a current uplink subframe of a primary carrier in a TDD mode, the downlink subframe corresponding to the current uplink subframe in answer information feedback.

The downlink subframe corresponding to the current uplink subframe is determined from downlink subframes of the secondary carrier in accordance with a predetermined downlink retransmission timing mode of the secondary carrier for a timeslot configuration of the primary carrier. In the predetermined downlink retransmission timing mode, uplink subframes of the primary carrier correspond to different downlink subframes of the secondary carrier, a set of the downlink subframes of the secondary carrier corresponding to the uplink subframes of the primary carrier includes all downlink subframes of the secondary carrier, and one of the uplink subframes of the primary carrier is separated from a corresponding downlink subframe of the secondary carrier by at least four subframes.

In the methods as shown in FIGS. 14 and 15, the uplink subframes of the primary carrier correspond to different downlink subframes of the secondary carrier, and the set of the downlink subframes of the secondary carrier corresponding to each uplink subframe includes all the downlink subframes of the secondary carrier. In this way, during the communication between the network side and the terminal through the secondary carrier, it is unnecessary to limit the use of the downlink subframes of the secondary carrier, i.e., all the downlink subframes of the secondary carrier may be used for the data transmission.

Further, in the predetermined downlink transmission timing mode, a difference between the quantities of the downlink subframes of the secondary carrier corresponding to the respective uplink subframes of the primary carrier is not greater than 1. In this way, it is able to substantially equally allocate the feedback of the answer information of the downlink subframes of the secondary carrier to each uplink subframe of the primary carrier.

Table 3 shows the predetermined downlink retransmission timing modes for the timeslot configurations in Table 1.

configuration of the primary carrier is configuration #1, in the predetermined downlink retransmission timing mode of the secondary carrier for the timeslot configuration of the primary carrier, subframe 2 in the downlink subframes of the secondary carrier corresponds to the fifth to seventh downlink subframes before it, subframe 3 corresponds to the fourth and fifth downlink subframes before it, subframe 7 corresponds to the fifth to seventh downlink subframes before it, and subframe 8 corresponds to the fourth and fifth downlink subframes before it.

In Table 3, in the case that, for the timeslot configuration of the primary carrier, subframe 2 and 7 are uplink subframes, subframes 1 and 6 are special subframes and the other subframes are downlink subframes, i.e., the timeslot configuration of the primary carrier is configuration #2, in the predetermined downlink retransmission timing mode of the secondary carrier for the timeslot configuration of the primary carrier, subframe 2 in the downlink subframes of the secondary carrier corresponds to the fourth to eighth downlink subframes before it, and subframe 7 corresponds to the fourth to eighth downlink subframes before it.

In Table 3, in the case that, for the timeslot configuration of the primary carrier, subframes 2, 3 and 4 are uplink subframes, subframe 1 is a special subframe and the other subframes are downlink subframes, i.e., the timeslot configuration of the primary carrier is configuration #3, in the predetermined downlink retransmission timing mode of the secondary carrier for the timeslot configuration of the primary carrier, subframe 2 in the downlink subframes of the secondary carrier corresponds to the eighth to eleventh downlink subframes before it, subframe 3 corresponds to the

TABLE 3

| Predetermined Downlink Retransmission Timing Modes of Secondary Carrier | | | | | | | | | | |
|---|---|---|---|---|---|---|---|---|---|---|
| Uplink-Downlink | Subframe Number | | | | | | | | | |
| Configuration | 0 | 1 | 2 | 3 | 4 | 5 | 6 | 7 | 8 | 9 |
| 0 | — | — | 5, 6 | 4, 5 | 4 | — | — | 5, 6 | 4, 5 | 4 |
| 1 | — | — | 7, 6, 5 | 4, 5 | — | — | — | 7, 6, 5 | 4, 5 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5, 4 | — | — | — | — | — |
| 4 | — | — | 12, 11, 10, 9, 8 | 8, 7, 6, 5, 4 | — | — | — | — | — | — |
| 5 | — | — | 13, 12, 11, 10, 9, 8, 7, 6, 5, 4, | — | — | — | — | — | — | — |
| 6 | — | — | 7, 6 | 6, 5 | 5, 4 | — | — | 6, 5 | 5, 4 | — |

In Table 3, in the case that, for the timeslot configuration of the primary carrier, subframes 2-4 and subframes 7-9 are uplink subframes, subframes 1 and 6 are special subframes and the other subframes are downlink subframes, i.e., the timeslot configuration of the primary carrier is configuration #0, in the predetermined downlink retransmission timing mode of the secondary carrier for the timeslot configuration of the primary carrier, subframe 2 in the downlink subframes of the secondary carrier corresponds to the fifth and sixth downlink subframes before it, subframe 3 corresponds to the fourth and fifth downlink subframes before it, subframe 4 corresponds to the fourth downlink subframe before it, subframe 7 corresponds to the fifth and sixth downlink subframe before it, subframe 8 corresponds to the fourth and fifth downlink subframes before it, and subframe 9 corresponds to the fourth downlink subframe before it.

In Table 3, in the case that, for the timeslot configuration of the primary carrier, subframes 2, 3, 7 and 8 are uplink subframes, subframes 1 and 6 are special subframes and the other subframes are downlink subframes, i.e., the timeslot sixth to eighth downlink subframes before it, and subframe 4 corresponds to the fourth to sixth downlink subframes before it.

In Table 3, in the case that, for the timeslot configuration of the primary carrier, subframes 2 and 3 are uplink subframes, subframe 1 is a special subframe and the other subframes are downlink subframes, i.e., the timeslot configuration of the primary carrier is configuration #4, in the predetermined downlink retransmission timing mode of the secondary carrier for the timeslot configuration of the primary carrier, subframe 2 in the downlink subframes of the secondary carrier corresponds to the eighth to twelfth downlink subframes before it, and subframe 3 corresponds to the fourth to eighth downlink subframes before it.

In Table 3, in the case that, for the timeslot configuration of the primary carrier, subframe 2 is an uplink subframe, subframe 1 is a special subframe and the other subframes are downlink subframes, i.e., the timeslot configuration of the primary carrier is configuration #5, in the predetermined downlink retransmission timing mode of the secondary carrier for the timeslot configuration of the primary carrier, subframe 2 in the downlink subframes of the secondary carrier corresponds to the fourth to thirteenth downlink subframes before it.

In Table 3, in the case that, for the timeslot configuration of the primary carrier, subframes 2-4 and 7-8 are uplink subframes, subframes 1 and 6 are special subframes and the other subframes are downlink subframes, i.e., the timeslot configuration of the primary carrier is configuration #6, in the predetermined downlink retransmission timing mode of the secondary carrier for the timeslot configuration of the primary carrier, subframe 2 in the downlink subframes of the secondary carrier corresponds to the sixth and seventh downlink subframes before it, subframe 3 corresponds to the fifth and sixth downlink subframes before it, subframe 4 corresponds to the fourth and fifth downlink subframes before it, subframe 7 corresponds to the fifth and sixth downlink subframes before it, and subframe 8 corresponds to the fourth and fifth downlink subframes before it.

The predetermined downlink retransmission timing modes of the secondary carrier for the timeslot configurations of the primary carrier in Table 3 are for illustrative purposes only. During the actual application, any other downlink retransmission timing modes may also be used, as long as the uplink subframes of the primary carrier correspond to different downlink subframes of the secondary carrier, the set of the downlink subframes of the secondary carrier corresponding to the uplink subframes of the primary carrier includes all downlink subframes of the secondary carrier, and one of the uplink subframes of the primary carrier is separated from the corresponding downlink subframe of the secondary carrier by at least four subframes.

In the third embodiment of the present disclosure, the answer information feedback for the primary carrier may be carried out in accordance with the downlink retransmission timing mode for the timeslot configuration of the primary carrier, which will not be particularly defined herein.

FIG. 16 is a schematic view showing the downlink retransmission timing mode of the secondary carrier in the third embodiment of the present disclosure, and FIG. 17 is a schematic view showing the answer information feedback corresponding to the downlink retransmission timing mode in FIG. 16.

Configuration #2 in Table 1 is adopted by the primary carrier, and an SDL mode is adopted by the secondary barrier. On the basis of the predetermined downlink retransmission timing mode of the secondary carrier for configuration #2 of the primary carrier in Table 3, subframe 2 of the primary carrier is used to feed back the answer information for the fourth to eighth downlink subframes of the secondary carrier before it, and subframe 7 of the primary carrier is used to feed back the answer information for the fourth to eighth downlink subframes of the secondary carrier before it, i.e., the downlink subframes directed to subframe 2 and 7 through arrows in FIG. 17.

Figure 18:
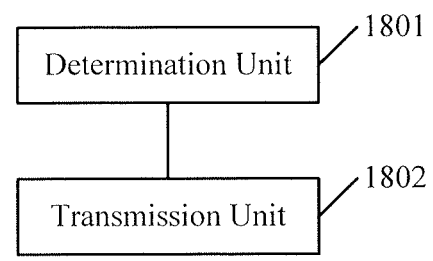
FIG. 18 is a schematic view showing an answer information feedback apparatus according to the third embodiment of the present disclosure.

Based on an identical inventive concept, the present disclosure further provides in the third embodiment an answer information feedback apparatus for a terminal which, as shown in FIG. 18, includes a determination unit 1801 and a transmission unit 1802. The determination unit 1801 is configured to, with respect to a current uplink subframe of a primary carrier in a TDD mode, determine a downlink subframe of a secondary carrier in an SDL mode and corresponding to the current uplink subframe in answer information feedback as a to-be-fed-back downlink subframe in accordance with a predetermined downlink retransmission timing mode of the secondary carrier for a timeslot configuration of the primary carrier. In the predetermined downlink retransmission timing mode, uplink subframes of the primary carrier correspond to different downlink subframes of the secondary carrier, a set of the downlink subframes of the secondary carrier corresponding to the uplink subframes of the primary carrier includes all downlink subframes of the secondary carrier, and one of the uplink subframes of the primary carrier is separated from a corresponding downlink subframe of the secondary carrier by at least four subframes. The transmission unit 1802 is configured to transmit answer information for the to-be-fed-back downlink subframe to a network side using the current uplink subframe.

Further, in the predetermined downlink retransmission timing mode, a difference between the quantities of the downlink subframes of the secondary carrier corresponding to the respective uplink subframes of the primary carrier is not greater than 1.

Further, in the case that, for the timeslot configuration of the primary carrier, subframes 2-4 and subframes 7-9 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth and sixth downlink subframes before it, subframe 3 corresponds to the fourth and fifth downlink subframes before it, subframe 4 corresponds to the fourth downlink subframe before it, subframe 7 corresponds to the fifth and sixth downlink subframe before it, subframe 8 corresponds to the fourth and fifth downlink subframes before it, and subframe 9 corresponds to the fourth downlink subframe before it.

Further, in the case that, for the timeslot configuration of the primary carrier, subframes 2, 3, 7 and 8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth to seventh downlink subframes before it, subframe 3 corresponds to the fourth and fifth downlink subframes before it, subframe 7 corresponds to the fifth to seventh downlink subframes before it, and subframe 8 corresponds to the fourth and fifth downlink subframes before it.

Further, in the case that, for the timeslot configuration of the primary carrier, subframe 2 and 7 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fourth to eighth downlink subframes before it, and subframe 7 corresponds to the fourth to eighth downlink subframes before it.

Further, in the case that, for the timeslot configuration of the primary carrier, subframes 2, 3 and 4 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to eleventh downlink subframes before it, subframe 3 corresponds to the sixth to eighth downlink subframes before it, and subframe 4 corresponds to the fourth to sixth downlink subframes before it.

Further, in the case that, for the timeslot configuration of the primary carrier, subframes 2 and 3 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to twelfth downlink subframes before it, and subframe 3 corresponds to the fourth to eighth downlink subframes before it.

Further, in the case that, for the timeslot configuration of the primary carrier, subframe 2 is an uplink subframe, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the fourth to thirteenth downlink subframes before it.

Further, in the case that, for the timeslot configuration of the primary carrier, subframes 2-4 and 7-8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the sixth and seventh downlink subframes before it, subframe 3 corresponds to the fifth and sixth downlink subframes before it, subframe 4 corresponds to the fourth and fifth downlink subframes before it, subframe 7 corresponds to the fifth and sixth downlink subframes before it, and subframe 8 corresponds to the fourth and fifth downlink subframes before it.

The functions of these units may refer to the steps of the above-mentioned method, and thus will not be particularly defined herein.

Figure 19:
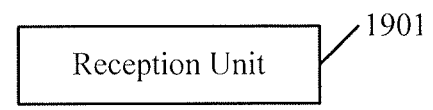
FIG. 19 is a schematic view showing an answer information reception apparatus according to the third embodiment of the present disclosure.

Based on an identical inventive concept, the present disclosure further provides in the third embodiment an answer information reception apparatus for a network side which, as shown in FIG. 19, includes a reception unit 1901 configured to receive answer information for a downlink subframe of a secondary carrier in an SDL mode, which is transmitted from a terminal using a current uplink subframe of a primary carrier in a TDD mode, the downlink subframe corresponding to the current uplink subframe in answer information feedback.

The downlink subframe corresponding to the current uplink subframe is determined from downlink subframes of the secondary carrier in accordance with a predetermined downlink retransmission timing mode of the secondary carrier for a timeslot configuration of the primary carrier. In the predetermined downlink retransmission timing mode, uplink subframes of the primary carrier correspond to different downlink subframes of the secondary carrier, a set of the downlink subframes of the secondary carrier corresponding to the uplink subframes of the primary carrier includes all downlink subframes of the secondary carrier, and one of the uplink subframes of the primary carrier is separated from a corresponding downlink subframe of the secondary carrier by at least four subframes.

Further, in the predetermined downlink retransmission timing mode, a difference between the quantities of the downlink subframes of the secondary carrier corresponding to the respective uplink subframes of the primary carrier is not greater than 1.

Further, in the case that, for the timeslot configuration of the primary carrier, subframes 2-4 and subframes 7-9 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth and sixth downlink subframes before it, subframe 3 corresponds to the fourth and fifth downlink subframes before it, subframe 4 corresponds to the fourth downlink subframe before it, subframe 7 corresponds to the fifth and sixth downlink subframe before it, subframe 8 corresponds to the fourth and fifth downlink subframes before it, and subframe 9 corresponds to the fourth downlink subframe before it.

Further, in the case that, for the timeslot configuration of the primary carrier, subframes 2, 3, 7 and 8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth to seventh downlink subframes before it, subframe 3 corresponds to the fourth and fifth downlink subframes before it, subframe 7 corresponds to the fifth to seventh downlink subframes before it, and subframe 8 corresponds to the fourth and fifth downlink subframes before it.

Further, in the case that, for the timeslot configuration of the primary carrier, subframe 2 and 7 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fourth to eighth downlink subframes before it, and subframe 7 corresponds to the fourth to eighth downlink subframes before it.

Further, in the case that, for the timeslot configuration of the primary carrier, subframes 2, 3 and 4 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to eleventh downlink subframes before it, subframe 3 corresponds to the sixth to eighth downlink subframes before it, and subframe 4 corresponds to the fourth to sixth downlink subframes before it.

Further, in the case that, for the timeslot configuration of the primary carrier, subframes 2 and 3 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to twelfth downlink subframes before it, and subframe 3 corresponds to the fourth to eighth downlink subframes before it.

Further, in the case that, for the timeslot configuration of the primary carrier, subframe 2 is an uplink subframe, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the fourth to thirteenth downlink subframes before it.

Further, in the case that, for the timeslot configuration of the primary carrier, subframes 2-4 and 7-8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the sixth and seventh downlink subframes before it, subframe 3 corresponds to the fifth and sixth downlink subframes before it, subframe 4 corresponds to the fourth and fifth downlink subframes before it, subframe 7 corresponds to the fifth and sixth downlink subframes before it, and subframe 8 corresponds to the fourth and fifth downlink subframes before it.

The functions of these units may refer to the steps of the above-mentioned method, and thus will not be particularly defined herein.

In the third embodiment of the present disclosure, the primary carrier may be a carrier at a licensed frequency band, and the secondary carrier may be a carrier at an unlicensed frequency band.

According to the third embodiment of the present disclosure, the downlink retransmission timing mode is pre-configured for the secondary carrier in accordance with the timeslot configuration of the primary carrier. In the predetermined downlink retransmission timing mode, the uplink subframes of the primary carrier correspond to different downlink subframes of the secondary carrier, the set of the downlink subframes of the secondary carrier corresponding to the uplink subframes of the primary carrier includes all downlink subframes of the secondary carrier, and one of the uplink subframes of the primary carrier is separated from a corresponding downlink subframe of the secondary carrier by at least four subframes. In this way, after the acquisition of the timeslot configuration of the primary carrier, the terminal may use the current uplink subframe of the primary carrier to feed back the answer information for the downlink subframe of the secondary carrier corresponding to the current uplink subframe in accordance with the predetermined downlink retransmission timing mode of the secondary carrier for the timeslot configuration of the primary carrier. As a result, it is able to feed back the answer information under the condition where the TDD mode is adopted by the primary carrier and the SDL mode is adopted by the secondary carrier.

The answer information feedback apparatus and the answer information reception apparatus in the embodiments of the present disclosure may be implemented via computer programs. It should be appreciated that, the above-mentioned division mode for the modules is merely one of the various division modes. The answer information feedback apparatus and the answer information reception apparatus including the other modules or including no module shall also fall within the scope of the present disclosure, as long as they have the above-mentioned functions.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. An answer information feedback method, comprising steps of:

with respect to a current uplink subframe of a primary carrier in a Time Division Duplexing (TDD) mode, determining, by a terminal, a downlink subframe of a secondary carrier in a Supplement Downlink (SDL) mode and corresponding to the current uplink subframe in answer information feedback as a to-be-fed-back downlink subframe, the to-be-fed-back downlink subframe being determined from designated downlink subframes of the secondary carrier in accordance with a downlink retransmission timing mode for a Downlink (DL)-reference Uplink (UL)/DL configuration of the secondary carrier, the designated downlink subframes comprising downlink subframes except a downlink subframe having a location identical to an uplink subframe indicated by the DL-reference UL/DL configuration, the DL-reference UL/DL configuration being identical to a timeslot configuration of the primary carrier; and transmitting answer information for the to-be-fed-back downlink subframe to a network side using the current uplink subframe.

2. The answer information feedback method according to claim 1, wherein prior to the step of determining the downlink subframe of the secondary carrier corresponding to the current uplink subframe in the answer information feedback, the answer information feedback method further comprising:

receiving from the network side feedback indication information indicating, with respect to each uplink subframe of the primary carrier for feeding back the answer information, a downlink subframe in the designated downlink subframes of the secondary carrier corresponding to the uplink subframe in the answer information feedback, and the step of determining the downlink subframe of the secondary carrier corresponding to the current uplink subframe in the answer information feedback comprises:

determining the downlink subframe of the secondary carrier corresponding to the current uplink subframe in the answer information feedback in accordance with the feedback indication information.

3. The answer information feedback method according to claim 1, wherein prior to the step of determining the downlink subframe of the secondary carrier corresponding to the current uplink subframe in the answer information feedback, the answer information feedback method further comprises:
   determining a timeslot configuration of the primary carrier as the DL-reference UL/DL configuration of the secondary carrier; and
   with respect to each uplink subframe of the primary carrier for feeding back the answer information, determining, from the designated downlink subframes of the secondary carrier, the downlink subframe corresponding to the uplink subframe in the answer information feedback in accordance with the downlink retransmission timing mode for the DL-reference UL/DL configuration, and storing a correspondence between the uplink subframe and the downlink subframe, and
   the step of determining the downlink subframe of the secondary carrier corresponding to the current uplink subframe in the answer information feedback comprises:
   determining the downlink subframe of the secondary carrier corresponding to the current uplink subframe in the answer information feedback in accordance with the stored correspondence.

4. The answer information feedback method according to claim 1, further comprising:
   during the communication with the network side through the secondary carrier, prohibiting the data transmission in the downlink subframe of the secondary carrier having the location identical to the uplink subframe indicated by the DL-reference UL/DL configuration.

5. An answer information reception method, comprising a step of:
   receiving, by a network side, answer information for a downlink subframe of a secondary carrier in a Supplement Downlink (SDL) mode, which is transmitted from a terminal using a current uplink subframe of a primary carrier in a Time Division Duplexing (TDD) mode, the downlink subframe corresponding to the current uplink subframe in answer information feedback,
   wherein the downlink subframe corresponding to the current uplink subframe is determined from designated downlink subframes of the secondary carrier in accordance with a downlink retransmission timing mode for a Downlink (DL)-reference Uplink (UL)/DL configuration of the secondary carrier, the designated downlink subframes comprise downlink subframes except a downlink subframe having a location identical to an uplink subframe indicated by the DL-reference UL/DL configuration, and the DL-reference UL/DL configuration is identical to a timeslot configuration of the primary carrier.

6. The answer information reception method according to claim 5, wherein prior to the step of receiving the answer information for the downlink subframe of the secondary carrier corresponding to the current uplink subframe in the answer information feedback, which is transmitted from the terminal using the current uplink subframe of the primary carrier, the answer information reception method further comprises:

determining a timeslot configuration of the primary carrier as the DL-reference UL/DL configuration of the secondary carrier;
   with respect to each uplink subframe of the primary carrier for feeding back the answer information, determining, from the designated downlink subframes of the secondary carrier, a downlink subframe corresponding to the uplink subframe in the answer information feedback in accordance with the downlink retransmission timing mode for the DL-reference UL/DL configuration, and acquiring feedback indication information indicating a determination result; and
   transmitting the feedback indication information to the terminal.

7. The answer information reception method according to claim 5, further comprising:
   during the communication with the terminal through the secondary carrier, prohibiting the data transmission in the downlink subframe of the secondary carrier having the location identical to the uplink subframe indicated by the DL-reference UL/DL configuration.

8. An answer information feedback method, comprising steps of:
   with respect to subframe 2 of a primary carrier in a Time Division Duplexing (TDD) mode, which serves as an uplink subframe, determining, by a terminal, a downlink subframe of a secondary carrier in a Supplement Downlink (SDL) mode and corresponding to subframe 2 in answer information feedback as a to-be-fed-back downlink subframe, the to-be-fed-back downlink subframe being determined from designated downlink subframes of the secondary carrier in accordance with a downlink retransmission timing mode for a Downlink (DL)-reference Uplink (UL)/DL configuration of the secondary carrier, the designated downlink subframes comprising downlink subframes except a downlink subframe having a location identical to an uplink subframe indicated by the DL-reference UL/DL configuration, the DL-reference UL/DL configuration comprising subframe 0 to subframe 9, in which subframe 1 is a special subframe, subframe 2 is an uplink subframe, and the other subframes are downlink subframes; and
   transmitting answer information for the to-be-fed-back downlink subframe to a network side using subframe 2.

9. The answer information feedback method according to claim 8, wherein prior to the step of determining the downlink subframe of the secondary carrier corresponding to subframe 2 in the answer information feedback, the answer information feedback method further comprises:
   receiving from the network side feedback indication information indicating, with respect to subframe 2 of the primary carrier for feeding back the answer information and serving as the uplink subframe, a downlink subframe in the designated downlink subframes of the secondary carrier corresponding to subframe 2 in the answer information feedback, and
   the step of determining the downlink subframe of the secondary carrier corresponding to subframe 2 in the answer information feedback comprises:
   determining the downlink subframe of the secondary carrier corresponding to subframe 2 in the answer information feedback in accordance with the feedback indication information.

10. The answer information feedback method according to claim 8, further comprising:

during the communication with the network side through the secondary carrier, prohibiting the data transmission in the downlink subframe of the secondary carrier having the location identical to the uplink subframe indicated by the DL-reference UL/DL configuration.

11. An answer information reception method, comprising a step of:
receiving, by a network side, answer information for a downlink subframe of a secondary carrier in a Supplement Downlink (SDL) mode, which is transmitted from a terminal using subframe 2 of a primary carrier in a Time Division Duplexing (TDD) mode which serves as an uplink subframe, the downlink subframe corresponding to subframe 2 in answer information feedback,
wherein the downlink subframe corresponding to subframe 2 is determined from designated downlink subframes of the secondary carrier in accordance with a downlink retransmission timing mode for a Downlink (DL)-reference Uplink (UL)/DL configuration of the secondary carrier, the designated downlink subframes comprise downlink subframes except a downlink subframe having a location identical to an uplink subframe indicated by the DL-reference UL/DL configuration, and the DL-reference UL/DL configuration comprises subframe 0 to subframe 9, in which subframe 1 is a special subframe, subframe 2 is an uplink subframe, and the other subframes are downlink subframes.

12. The answer information reception method according to claim 11, wherein prior to the step of receiving the answer information for the downlink subframe of the secondary carrier corresponding to subframe 2 in answer information feedback, the answer information reception method further comprises:
determining that, in subframes 0 to 9 for the DL-reference UL/DL configuration of the secondary carrier, subframe 1 is a special substrate, subframe 2 is an uplink subframe, and the other subframes are downlink subframes;
with respect to subframe 2 of the primary carrier for feeding back the answer information, determining, from the designated downlink subframes of the secondary carrier, a downlink subframe corresponding to subframe 2 in the answer information feedback in accordance with the downlink retransmission timing mode for the DL-reference UL/DL configuration, and acquiring feedback indication information indicating a determination result; and
transmitting the feedback indication information to the terminal.

13. The answer information feedback method according to claim 11, further comprising:
during the communication with the terminal through the secondary carrier, prohibiting the data transmission in the downlink subframe of the secondary carrier having the location identical to the uplink subframe indicated by the DL-reference UL/DL configuration.

14. An answer information feedback method, comprising steps of:
with respect to a current uplink subframe of a primary carrier in a Time Division Duplexing (TDD) mode, determining a downlink subframe of a secondary carrier in a Supplement Downlink (SDL) mode and corresponding to the current uplink subframe in answer information feedback as a to-be-fed-back downlink subframe in accordance with a predetermined downlink retransmission timing mode of the secondary carrier for a timeslot configuration for the primary carrier, in the predetermined downlink retransmission timing mode, uplink subframes of the primary carrier corresponding to different downlink subframes of the secondary carrier, a set of the downlink subframes of the secondary carrier corresponding to the respective uplink subframes of the primary carrier comprising all downlink subframes of the secondary carrier, one of the uplink subframes of the primary carrier being separated from a corresponding downlink subframe of the secondary carrier by at least four subframes; and
transmitting answer information for the to-be-fed-back downlink subframe to a network side using the current uplink subframe.

15. The answer information feedback method according to claim 14, wherein in the predetermined downlink retransmission timing mode, a difference between the quantities of the downlink subframes of the secondary carrier corresponding to the respective uplink subframes of the primary carrier is not greater than 1.

16. The answer information feedback method according to claim 14, wherein in the case that, for the timeslot configuration of the primary carrier, subframes 2-4 and subframes 7-9 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth and sixth downlink subframes before it, subframe 3 corresponds to the fourth and fifth downlink subframes before it, subframe 4 corresponds to the fourth downlink subframe before it, subframe 7 corresponds to the fifth and sixth downlink subframe before it, subframe 8 corresponds to the fourth and fifth downlink subframes before it, and subframe 9 corresponds to the fourth downlink subframe before it.

17. The answer information feedback method according to claim 14, wherein in the case that, for the timeslot configuration of the primary carrier, subframes 2, 3, 7 and 8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth to seventh downlink subframes before it, subframe 3 corresponds to the fourth and fifth downlink subframes before it, subframe 7 corresponds to the fifth to seventh downlink subframes before it, and subframe 8 corresponds to the fourth and fifth downlink subframes before it.

18. The answer information feedback method according to claim 14, wherein in the case that, for the timeslot configuration of the primary carrier, subframes 2 and 7 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fourth to eighth downlink subframes before it, and subframe 7 corresponds to the fourth to eighth downlink subframes before it.

19. The answer information feedback method according to claim 14, wherein in the case that, for the timeslot configuration of the primary carrier, subframes 2, 3 and 4 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to eleventh downlink subframes before it, subframe 3 corresponds to the sixth to eighth downlink subframes before it, and subframe 4 corresponds to the fourth to sixth downlink subframes before it.

20. The answer information feedback method according to claim 14, wherein in the case that, for the timeslot configuration of the primary carrier, subframes 2 and 3 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to twelfth downlink subframes before it, and subframe 3 corresponds to the fourth to eighth downlink subframes before it.

21. The answer information feedback method according to claim 14, wherein in the case that, for the timeslot configuration of the primary carrier, subframe 2 is an uplink subframe, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the fourth to thirteenth downlink subframes before it.

22. The answer information feedback method according to claim 14, wherein in the case that, for the timeslot configuration of the primary carrier, subframes 2-4 and 7-8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the sixth and seventh downlink subframes before it, subframe 3 corresponds to the fifth and sixth downlink subframes before it, subframe 4 corresponds to the fourth and fifth downlink subframes before it, subframe 7 corresponds to the fifth and sixth downlink subframes before it, and subframe 8 corresponds to the fourth and fifth downlink subframes before it.

23. An answer information reception method, comprising a step of:
receiving, by a network side, answer information for a downlink subframe of a secondary carrier in a Supplement Downlink (SDL) mode, which is transmitted from a terminal using a current uplink subframe of a primary carrier in a Time Division Duplexing (TDD) mode, the downlink subframe corresponding to the current uplink subframe in answer information feedback,
wherein the downlink subframe corresponding to the current uplink subframe is determined from downlink subframes of the secondary carrier in accordance with a predetermined downlink retransmission timing mode of the secondary carrier for a timeslot configuration of the primary carrier, in the predetermined downlink retransmission timing mode, uplink subframes of the primary carrier correspond to different downlink subframes of the secondary carrier, a set of the downlink subframes of the secondary carrier corresponding to the respective uplink subframes of the primary carrier comprises all downlink subframes of the secondary carrier, and one of the uplink subframes of the primary carrier is separated from a corresponding downlink subframe of the secondary carrier by at least four subframes.

24. The answer information reception method according to claim 23, wherein in the predetermined downlink retransmission timing mode, a difference between the quantities of the downlink subframes of the secondary carrier corresponding to the respective uplink subframes of the primary carrier is not greater than 1.

25. The answer information reception method according to claim 23, wherein in the case that, for the timeslot configuration of the primary carrier, subframes 2-4 and subframes 7-9 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth and sixth downlink subframes before it, subframe 3 corresponds to the fourth and fifth downlink subframes before it, subframe 4 corresponds to the fourth downlink subframe before it, subframe 7 corresponds to the fifth and sixth downlink subframe before it, subframe 8 corresponds to the fourth and fifth downlink subframes before it, and subframe 9 corresponds to the fourth downlink subframe before it.

26. The answer information reception method according to claim 23, wherein in the case that, for the timeslot configuration of the primary carrier, subframes 2, 3, 7 and 8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fifth to seventh downlink subframes before it, subframe 3 corresponds to the fourth and fifth downlink subframes before it, subframe 7 corresponds to the fifth to seventh downlink subframes before it, and subframe 8 corresponds to the fourth and fifth downlink subframes before it.

27. The answer information reception method according to claim 23, wherein in the case that, for the timeslot configuration of the primary carrier, subframes 2 and 7 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the fourth to eighth downlink subframes before it, and subframe 7 corresponds to the fourth to eighth downlink subframes before it.

28. The answer information reception method according to claim 23, wherein in the case that, for the timeslot configuration of the primary carrier, subframes 2, 3 and 4 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to eleventh downlink subframes before it, subframe 3 corresponds to the sixth to eighth downlink subframes before it, and subframe 4 corresponds to the fourth to sixth downlink subframes before it.

29. The answer information reception method according to claim 23, wherein in the case that, for the timeslot configuration of the primary carrier, subframes 2 and 3 are uplink subframes, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the eighth to twelfth downlink subframes before it, and subframe 3 corresponds to the fourth to eighth downlink subframes before it.

30. The answer information reception method according to claim 23, wherein in the case that, for the timeslot configuration of the primary carrier, subframe 2 is an uplink subframe, subframe 1 is a special subframe and the other subframes are downlink subframes, in the predetermined downlink retransmission timing mode of the secondary carrier for the timeslot configuration of the primary carrier, subframe 2 in the downlink subframes of the secondary carrier corresponds to the fourth to thirteenth downlink subframes before it.

31. The answer information reception method according to claim 23, wherein in the case that, for the timeslot configuration of the primary carrier, subframes 2-4 and 7-8 are uplink subframes, subframes 1 and 6 are special subframes and the other subframes are downlink subframes, in the predetermined downlink retransmission timing mode of the secondary carrier for the timeslot configuration of the primary carrier, subframe 2 in the downlink subframes of the secondary carrier corresponds to the sixth and seventh downlink subframes before it, subframe 3 corresponds to the fifth and sixth downlink subframes before it, subframe 4 corresponds to the fourth and fifth downlink subframes before it, subframe 7 corresponds to the fifth and sixth downlink subframes before it, and subframe 8 corresponds to the fourth and fifth downlink subframes before it.

\* \* \* \* \*